US009124056B1

(12) United States Patent
Lewis, Jr.

(10) Patent No.: US 9,124,056 B1
(45) Date of Patent: Sep. 1, 2015

(54) ROTATING POWER GROMMET

(71) Applicant: Doug Mockett & Company, Inc., Torrance, CA (US)

(72) Inventor: Charles Richard Lewis, Jr., Palo Alto, CA (US)

(73) Assignee: Doug Mockett & Company, Inc., Torrance, CA (US)

( * ) Notice: Subject to any disclaimer, the term of this patent is extended or adjusted under 35 U.S.C. 154(b) by 34 days.

(21) Appl. No.: 14/219,260

(22) Filed: Mar. 19, 2014

(51) Int. Cl.
H01R 39/00 (2006.01)
H01R 39/64 (2006.01)
H01R 25/00 (2006.01)

(52) U.S. Cl.
CPC .............. H01R 39/64 (2013.01); H01R 25/003 (2013.01); H01R 25/006 (2013.01)

(58) Field of Classification Search
CPC .. H01R 35/04; H01R 2103/00; H01R 23/025; H01R 31/06; H01R 2201/06
USPC .......... 439/13, 640, 23, 24, 650, 214, 171, 31
See application file for complete search history.

(56) References Cited

U.S. PATENT DOCUMENTS

| | | | |
|---|---|---|---|
| 4,148,544 A * | 4/1979 | Markowitz | 439/640 |
| 4,747,788 A * | 5/1988 | Byrne | 439/131 |
| 4,850,880 A | 7/1989 | Zayat, Jr. et al. | |
| 5,351,173 A * | 9/1994 | Byrne | 362/127 |
| D406,120 S | 2/1999 | Stanfield | |
| 5,915,974 A | 6/1999 | Carter | |
| 6,054,657 A * | 4/2000 | Liao | 200/51.02 |
| 6,234,812 B1 * | 5/2001 | Ivers et al. | 439/131 |
| 6,296,522 B1 * | 10/2001 | Ho | 439/640 |
| 6,302,743 B1 * | 10/2001 | Chiu et al. | 439/652 |
| 6,638,074 B1 * | 10/2003 | Fisher | 439/22 |
| 6,780,038 B1 * | 8/2004 | Huang | 439/224 |
| 6,873,808 B2 * | 3/2005 | Ueda | 399/90 |
| 6,940,015 B2 * | 9/2005 | Fang | 174/53 |
| 7,035,126 B1 * | 4/2006 | Lanni | 363/142 |
| 7,040,932 B1 * | 5/2006 | Klitzner | 439/668 |
| 7,163,409 B1 * | 1/2007 | Chen et al. | 439/131 |
| 7,229,322 B2 * | 6/2007 | Bangert | 439/638 |
| 7,264,514 B2 * | 9/2007 | Hsu et al. | 439/640 |
| 7,341,463 B2 * | 3/2008 | Lai | 439/131 |
| 7,393,212 B2 | 7/2008 | Parker | |
| 7,445,513 B1 * | 11/2008 | Lee | 439/652 |
| 7,462,074 B1 * | 12/2008 | Devlin et al. | 439/640 |
| 7,500,854 B2 * | 3/2009 | Gottstein | 439/13 |
| 7,605,330 B1 * | 10/2009 | Black et al. | 174/54 |
| 7,819,665 B1 * | 10/2010 | Nishizawa | 439/13 |
| 7,845,951 B1 * | 12/2010 | Goon | 439/21 |
| 8,142,199 B1 * | 3/2012 | Almouli | 439/10 |
| 8,172,625 B2 | 5/2012 | Kashiwada et al. | |

(Continued)

*Primary Examiner* — Abdullah Riyami
*Assistant Examiner* — Vladimir Imas
(74) *Attorney, Agent, or Firm* — Sanford Astor; Brooks Kushman P.C.

(57) ABSTRACT

A 360° rotatable power grommet mounted in an aperture in a work surface, three vertical copper strips, each connected to a wire which passes through a base to connect to an electrical power source. The copper strips are mounted in a vertical shaft which connects to a base. There are one or more electrical receptacles having arms which rotate horizontally and close to form a central bore, the arms having inner surfaces which are molded with horizontal copper strips, the central bore clamping to the vertical shaft to transfer power from the vertical shaft to the horizontal copper strips, the central bore allowing each electrical receptacle to separately rotate 360° around the vertical shaft.

16 Claims, 12 Drawing Sheets

(56) References Cited

U.S. PATENT DOCUMENTS

| | | |
|---|---|---|
| 8,287,284 B1 | 10/2012 | Nishizawa |
| 8,563,883 B1 * | 10/2013 | Flegel ........................ 200/50.02 |
| 8,598,453 B2 * | 12/2013 | Hsiao ............................. 174/53 |
| 8,690,611 B2 * | 4/2014 | Selvitelli et al. .............. 439/729 |
| 9,004,716 B2 * | 4/2015 | Ai ................................. 362/219 |

* cited by examiner

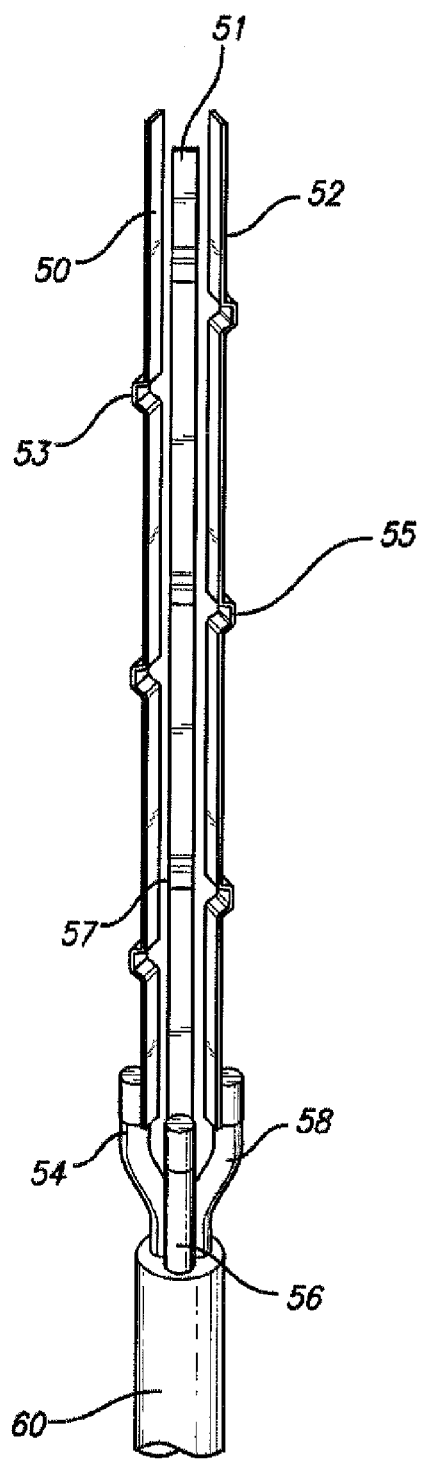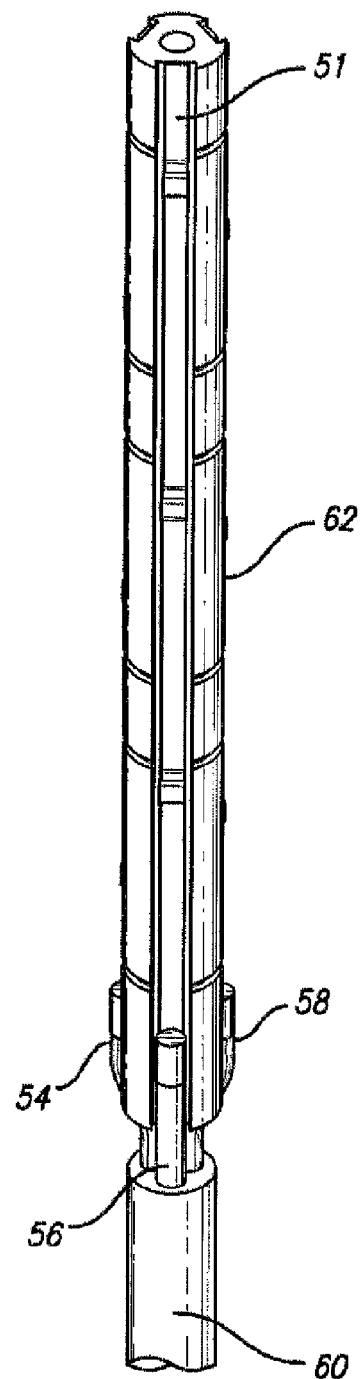
FIG. 3                    FIG. 4

ROTATING POWER GROMMET

TECHNICAL FIELD

This invention relates to a rotating power grommet to supply electric lines and data lines into a work surface, such as a conference table, boardroom table or office desk.

BACKGROUND

There are devices for supplying electric power and data devices into work surfaces, desks, counters, conference tables, boardroom tables, and any other surfaces where power, data, are needed. Present solutions to this problem generally involve a metal box, with or without a lid, making it difficult for a designer to integrate it into furniture. Designers have solved this problem by recessing the box beneath a table but this creates a problem of how to open the door, and how to avoid damaging the adjacent surface of the table while doing so.

Other designers offer interfaces that raise and lower a power and data device, which have a number of power receptacles, with or without data terminals. These devices have each of the receptacles and terminals lined up in a row on one side or on opposite sides in a fixed position. An example is shown in U.S. Pat. No. 4,747,788. Depending on the power grommet's orientation the receptacles might not be easily accessible or one of the free outlets might be blocked by a larger plug. Turning the outlets to any direction offers a new level access and personalization of cords.

SUMMARY

The power and data grommet of this invention comprises a grommet adapted to be placed in an aperture in the desk or other work surface. An aperture is manufactured or drilled through the top of the work surface. A housing; which is adapted to fit into the aperture, comprises, a plurality of power receptacles, each of which is rotatable 360°, so that it is easy for a person to plug into a receptacle facing the person, at any part of the table. The grommet of this invention may, or may not, lower into the table and raise up when in use.

BRIEF DESCRIPTION OF THE DRAWINGS

FIG. 3 is a perspective view of the central core shaft of the grommet;

FIG. 4 is a perspective view of the central core shaft with a covering;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
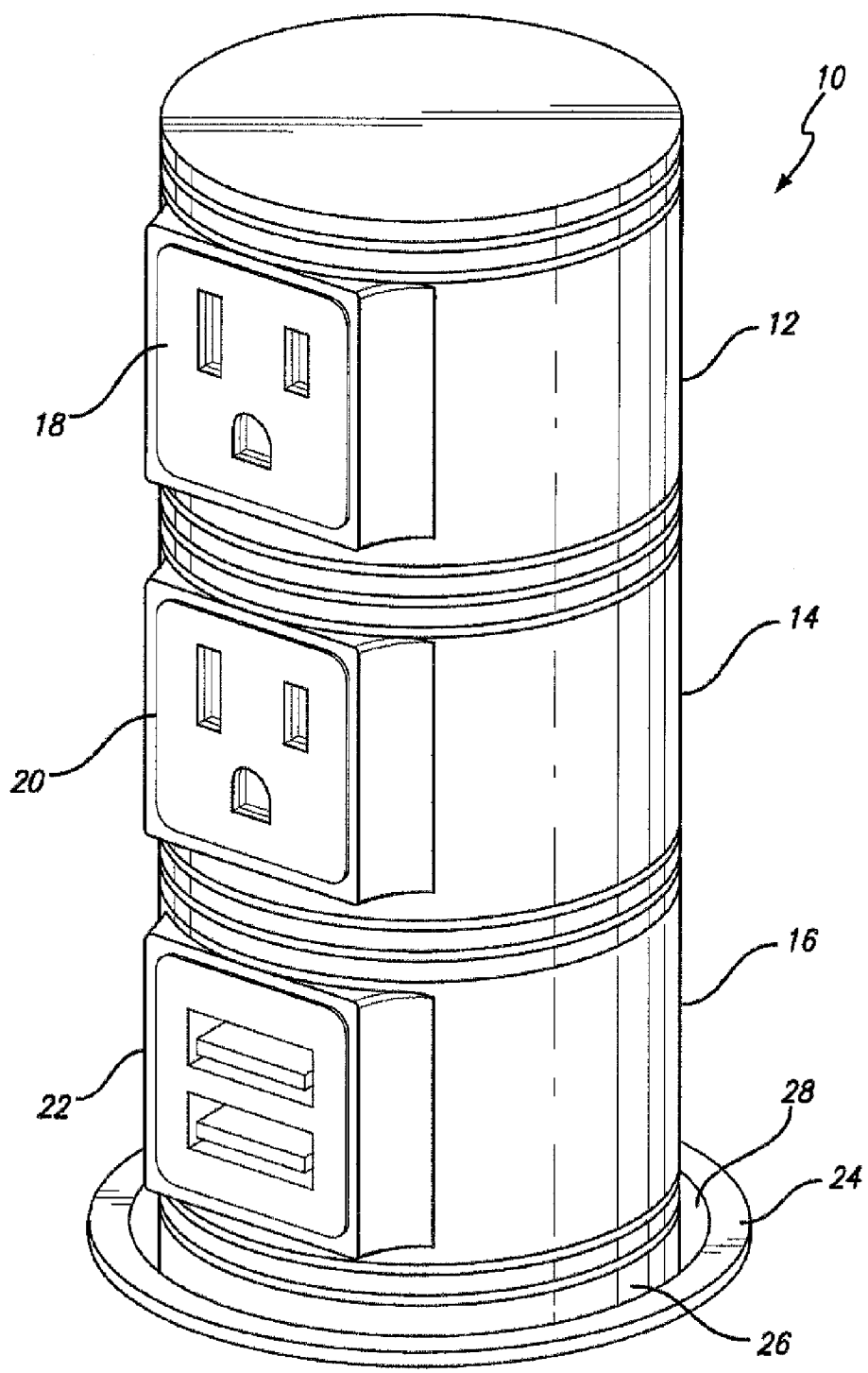
FIG. 1 is a perspective view of the grommet of this invention, with the power plugs and data plug lined up, similar to the prior art.

Referring now to the drawings, there is shown in FIG. 1 a perspective view of the circular grommet 10 of the present invention. There are three sections of the grommet 12, 14, and 16. Section 12 has an electrical plug 18, section 14 also has an electrical plug 20 and section 16 has a data plug 22. The grommet could have a plurality of modules each having an electrical plug or a data port. The grommet modules could have all electrical plugs or all data plugs, depending upon need. The drawings shown in this application generally show three modules, strictly for ease of description, but the grommet could have less or more electrical plugs, up to even 5 or more modules or combination of electrical plugs and data plugs.

A liner 24 fits into a hole 28 in the desk top where grommet 10 is installed. A base portion 26 of the grommet fits down below the surface of the desk top 34 (see FIG. 2).

Figure 2:
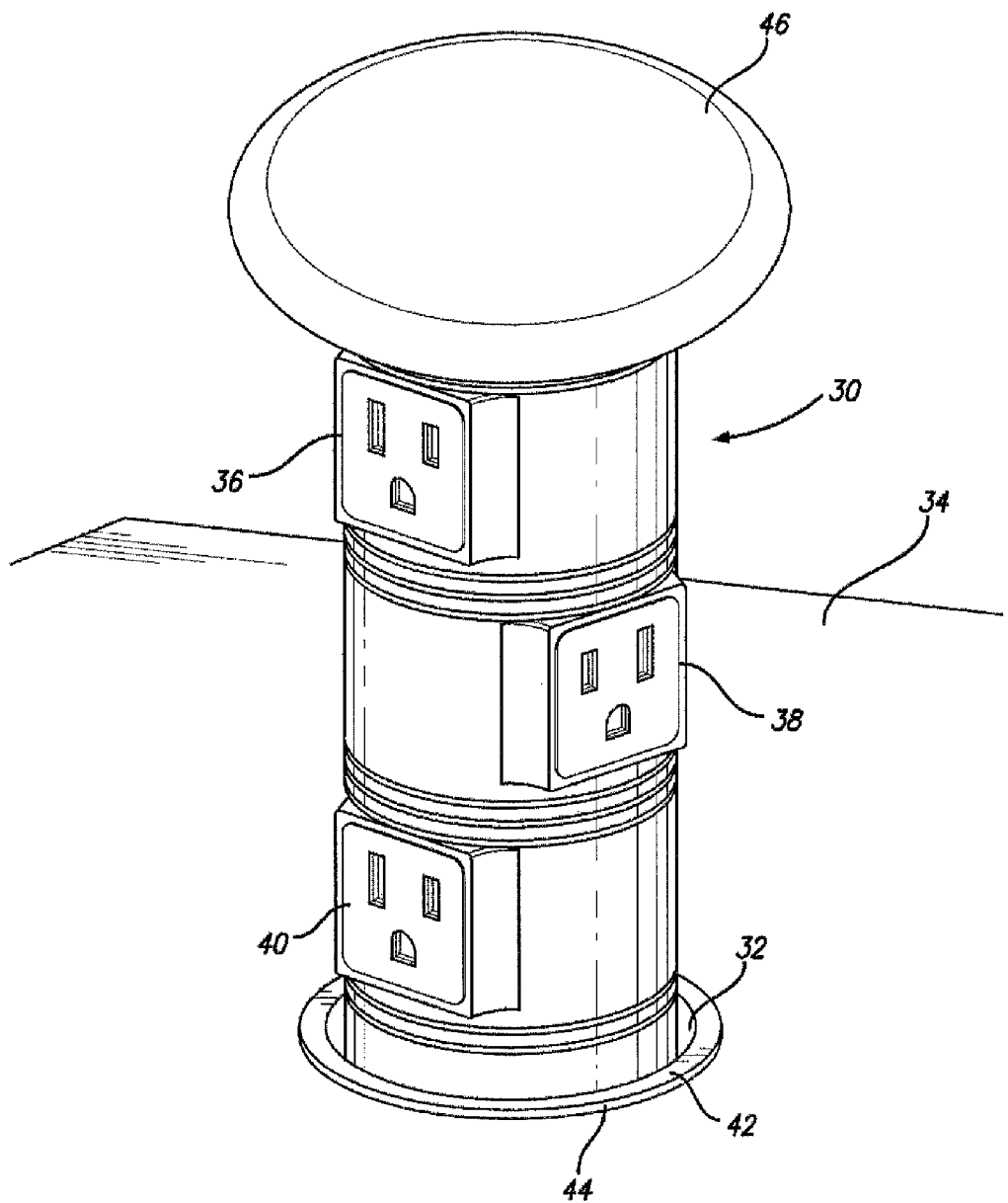
FIG. 2 is a perspective view of the grommet with three power plugs, with the center plug rotated 90°.

Referring to FIG. 2, there is shown a similar grommet 30 fitting into a hole 32 in the desk top 34. The grommet has three electrical plugs 36, 38 and 40. A liner 42 fits into hole 32. The liner has a lip 44 which lays on the top of the desk top 34. Lip 44 has a greater diameter than hole 32 so that the grommet does not fall through hole 32. This grommet 30 also has a top 46 which has an optional light connected under top 46. Plug 38 is shown rotated 90°. Each of the plugs 36, 38 and 40 can be rotated 360° to any desired location.

FIG. 3 shows the internal structure of the rotating power grommet. There are three stamped vertical copper strips 50, 51 and 52 for the positive, negative and ground. These strips are soldered to wires 54, 56 and 58 which continue through a base 60 below to reach an outside electrical power source. Referring to FIG. 4, there is shown the copper strips mounted in a vertical plastic shaft 62. Only copper strip 51 is visible. Wires 54, 56 and 58 continue into base 60.

Figure 5:
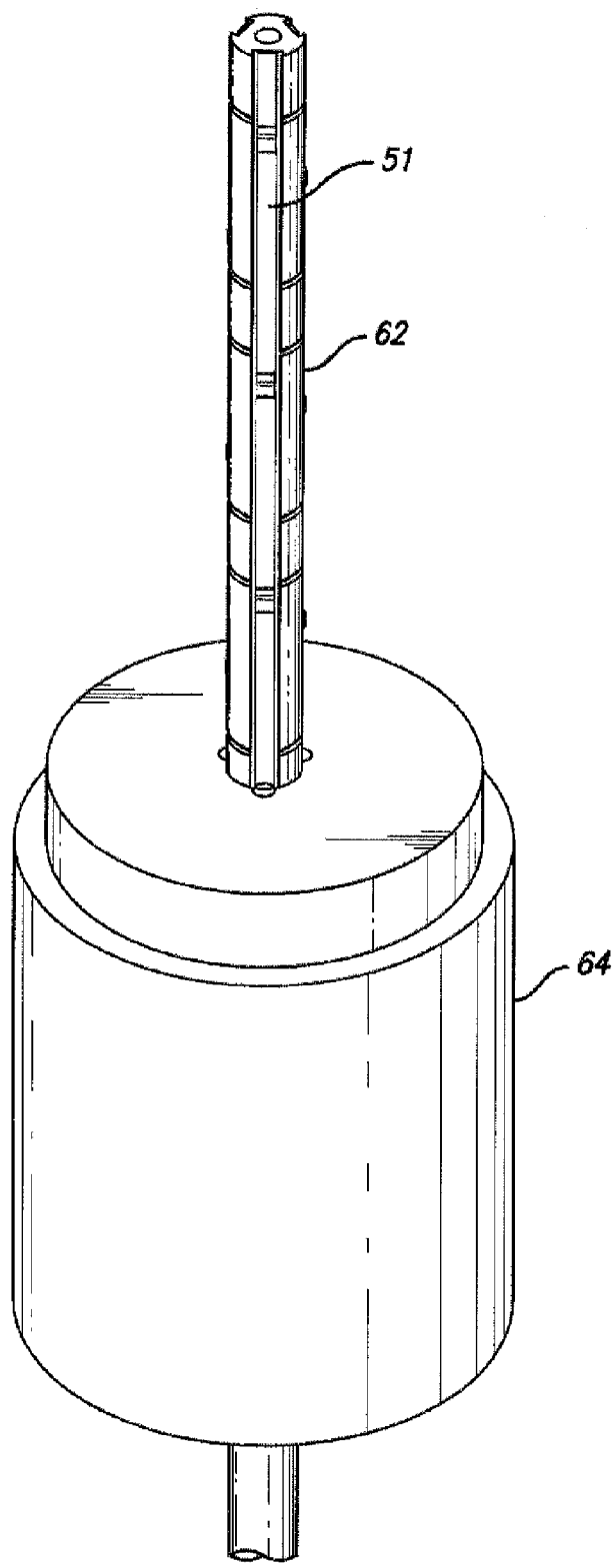
FIG. 5 is a perspective view of the central core shaft mounted into a base.

Shaft 62 mounts into base 64 as shown in FIG. 5. Each copper strip 50, 51 and 52 has a plurality of small folds 53, 55 and 57 (as examples) that extend outward from their recess to make contact with horizontal rings (shown in FIGS. 6 and 7) to transfer electrical power to the plugs. The horizontal rings are contained in a two part clamp to facilitate assembly and stacking of multiple receptacles.

Figure 6:
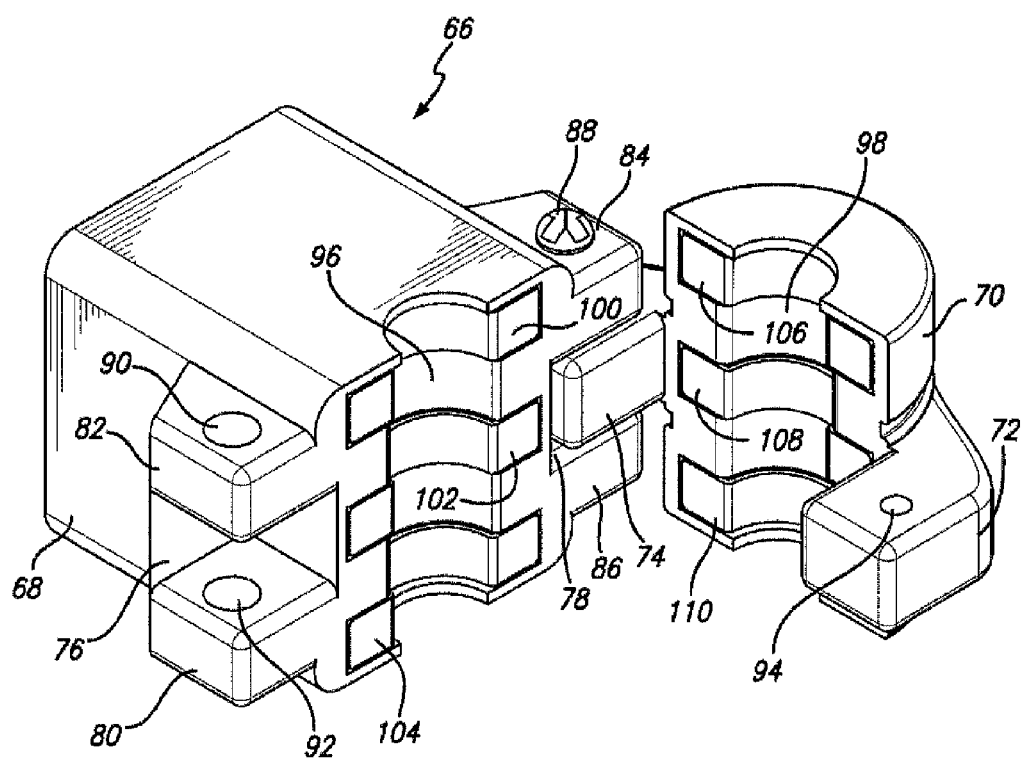
FIG. 6 is a perspective view of a receptacle of this invention.

Referring to FIG. 6, there is shown an electrical receptacle 66 of the rotating power grommet. Receptacle 66 has two parts, 68 and 70. Part 70 has two arms 72 and 74 which are adapted to swing into openings 76 and 78 in part 68. Openings 76 and 78 are spaced between arms 80 and 82 and arms 84 and 86. When arm 74 fits between arm 84 and 86, a connector, such as a screw 88, fits into holes in the arms 84, 86 and 74 to hold the two parts 68 and 70 together. The holes in arms 84, 86 and 74 are not visible but holes 90 and 92 and 94 show how they will also swing into place and can be tightened by a connector, such as a screw 89.

When closed, the two parts 68 and 70 form a central hole, created by semi-holes 96, 98. Inner surfaces of semi holes 96 and 98 are molded with copper strips 100, 102 and 104 in part 68 and 106, 108 and 110 in part 70. Vertical shaft 62 is clamped into the central hole discussed above. This transfers electrical power from vertical shaft 62 to the horizontal copper strips 100-110 and allows for a 360° rotation of the plugs.

Figure 7:
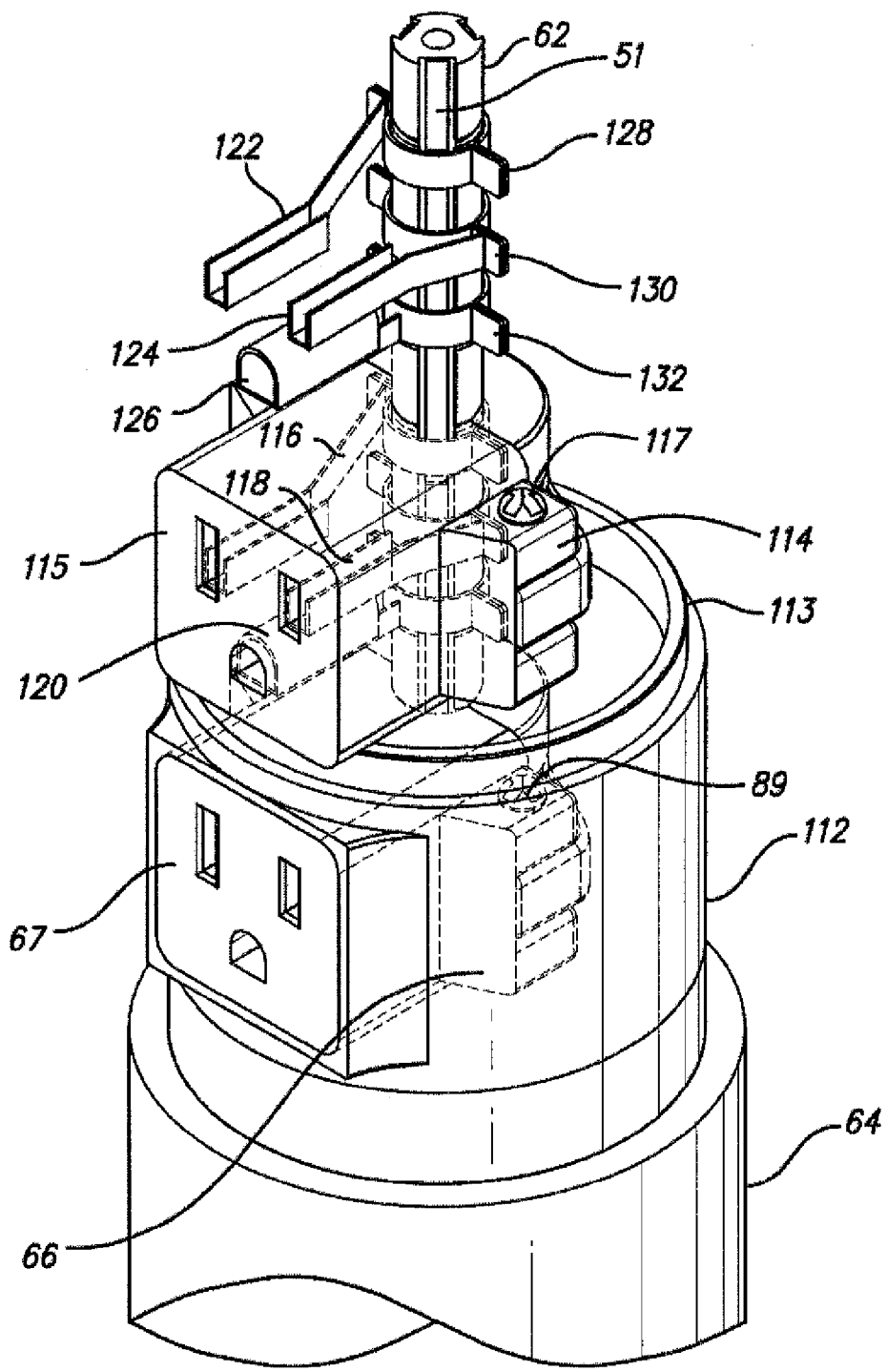
FIG. 7 is a perspective and hidden line view of receptacles and their interior.

Referring now to FIG. 7, there is shown the placement of plug 66, with face 67 into a plastic housing 112. Plastic housing 112 has a smaller diameter section 113. When another plastic housing (not shown) is placed above plastic housing 112, the bottom diameter sits on top of the ridge formed by smaller diameter 113. This can be continued upward as each plug is placed into another plastic housing. Dotted lines are used to show that the dotted parts are inside of the grommet outer shell. Electrical receptacle 114, with face 115, is fixed above receptacle 66. Each receptacle can rotate 360° separate from each other receptacle. As described in FIG. 6, receptacle 114 is molded with copper strips and vertical shaft 62 is clamped into the central hole.

Plug pins 116, 118 and 120 are three female pins which sit inside of receptacle 114. Pins 122, 124 and 126, sitting above receptacle 114, show the connection between the pins 122, 124 and 126, each having a copper strap 128, 130 and 132, tightened around shaft 62, to transfer the vertical power of shaft 62 to the copper straps 128, 130 and 132. The receptacle is not shown in order to show the manner in which the pins are connected. Each of the three receptacles 66, 114 and a receptacle not shown, which will use pins 122, 124 and 126, to form another receptacle, are separately rotatable 360°.

Figure 8:
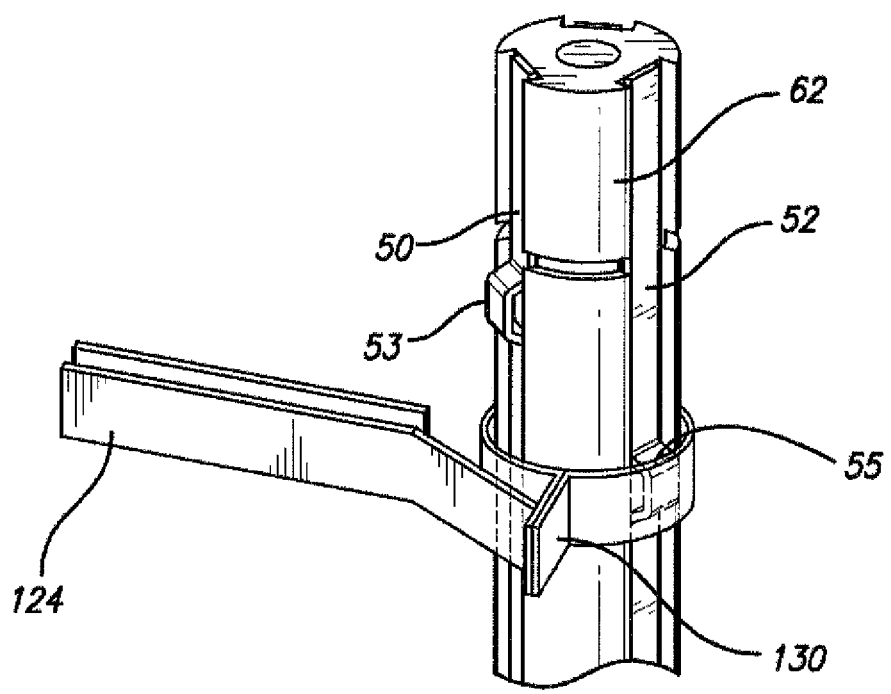
FIG. 8 is a front view of a portion of plugs of the invention.

Referring now to FIG. 8, there is shown a portion of shaft 62 with vertical copper strips 50 and 52. As shown previously, copper strip 50 has a plurality of small folds, 53 is shown, and copper strip 52 has a small fold 55 shown. These folds 53 and 55 (as examples) extend out from their recess to make contact with horizontal rings (shown in FIGS. 6 and 7) to transfer the power to the plugs. Copper strap 130 is tightened around shaft 62 and contacts small fold 55 to transfer electrical power to pin 124, which receives a male plug pin (three plug pins are usually used) to supply electric power to whatever device is plugged in.

Figure 9:
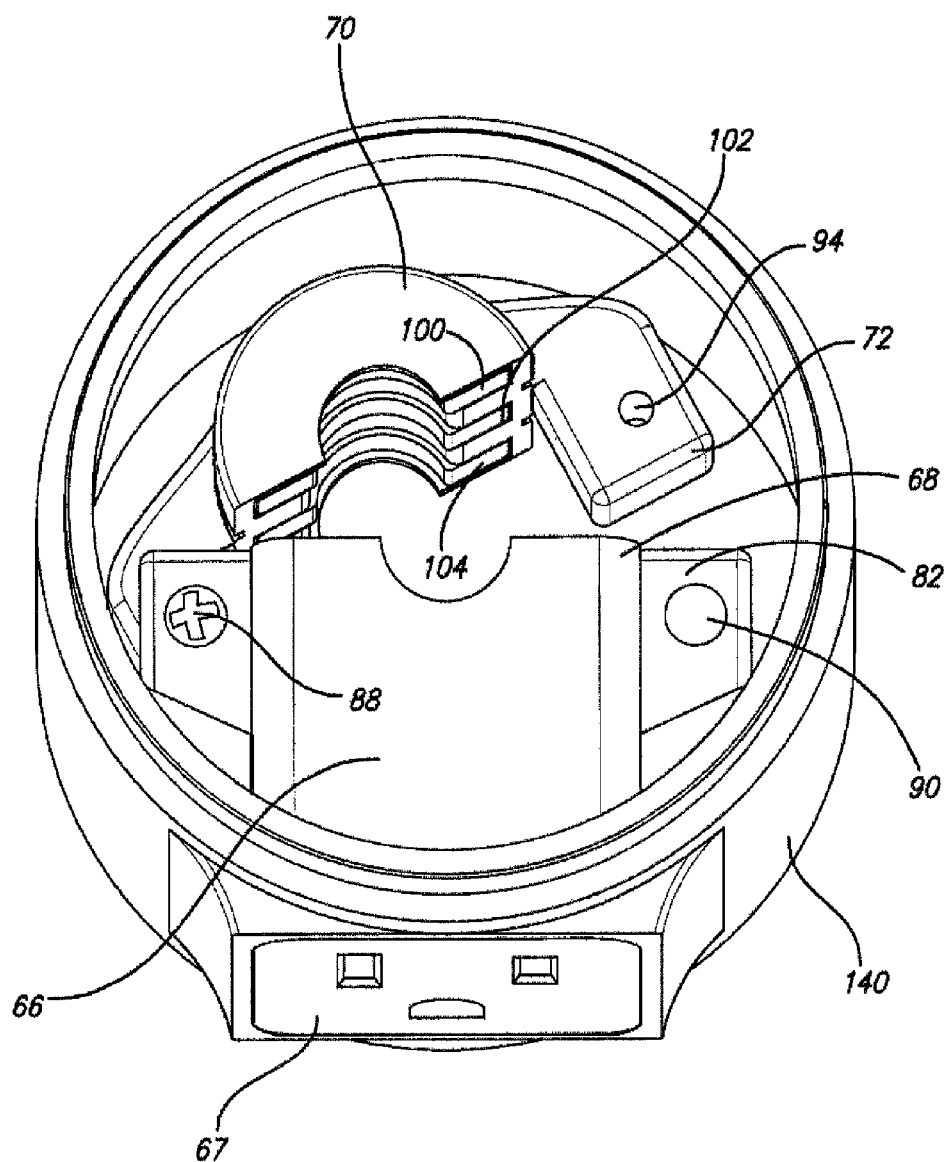
FIG. 9 is a top view of a receptacle.

Referring to FIG. 9, there is shown the typical plug assembly 66, with face 67, shown in FIGS. 6 and 7. The plug assembly 66 is snapped into the receptacle opening of a plastic housing 140. Part 68 and 70 are ready to be closed around shaft 62. Copper strips 100, 102 and 104 will take horizontal power transfer of the vertical power (shaft 62). Arm 72 will rotate under arm 82 and when fully rotated in, a screw will pass through holes 90 and 94, similar to screw 88 to close receptacle 66.

Figure 10:
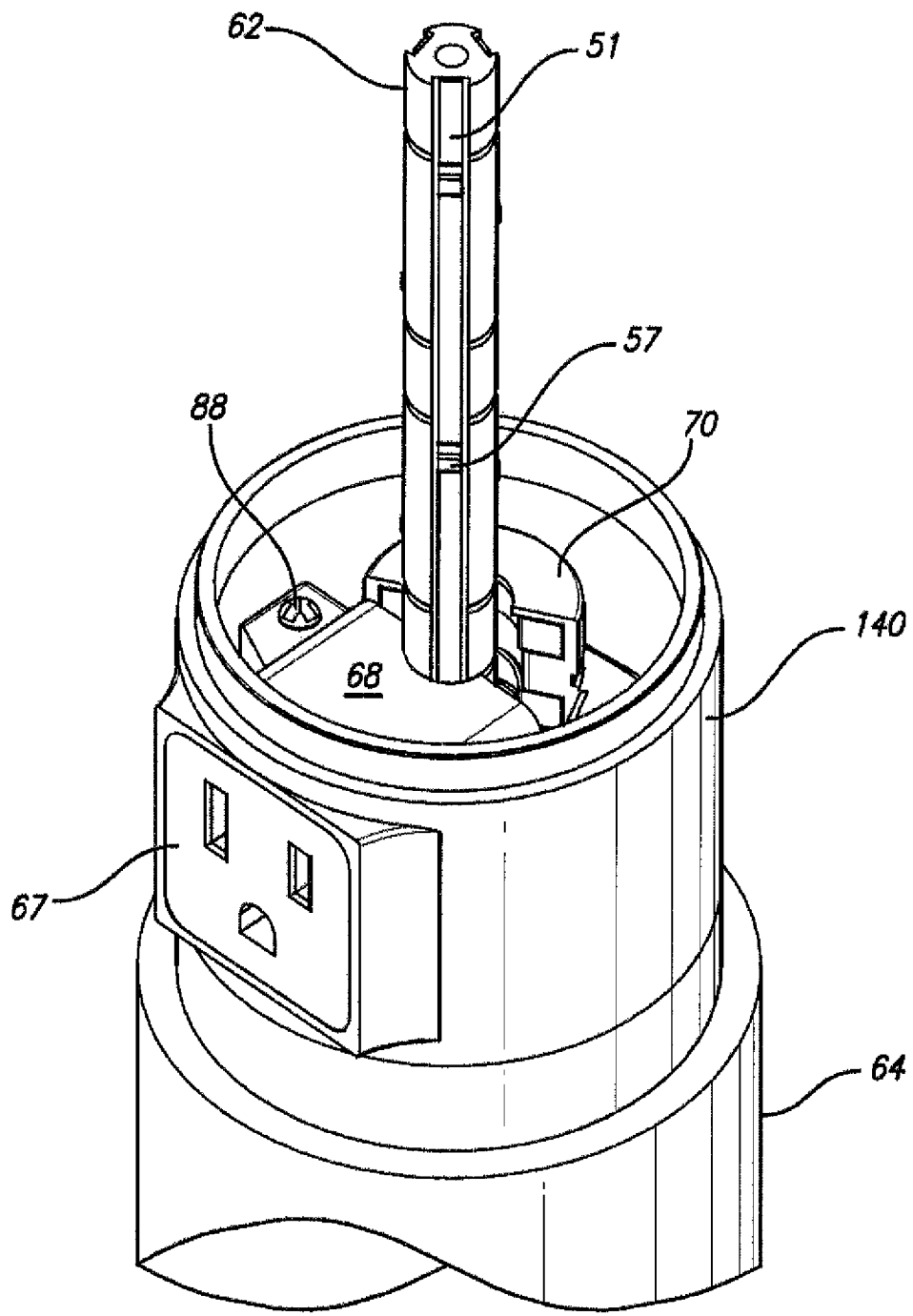
FIG. 10 is a perspective view of a ring placed over the shaft.

In FIG. 10, housing 140, with face 67, is then dropped over shaft 62 which has copper strip 51 with fold 57. Parts 68 and 70 are ready to be closed over shaft 62, and a screw inserted, similar to screw 88.

Figure 11:
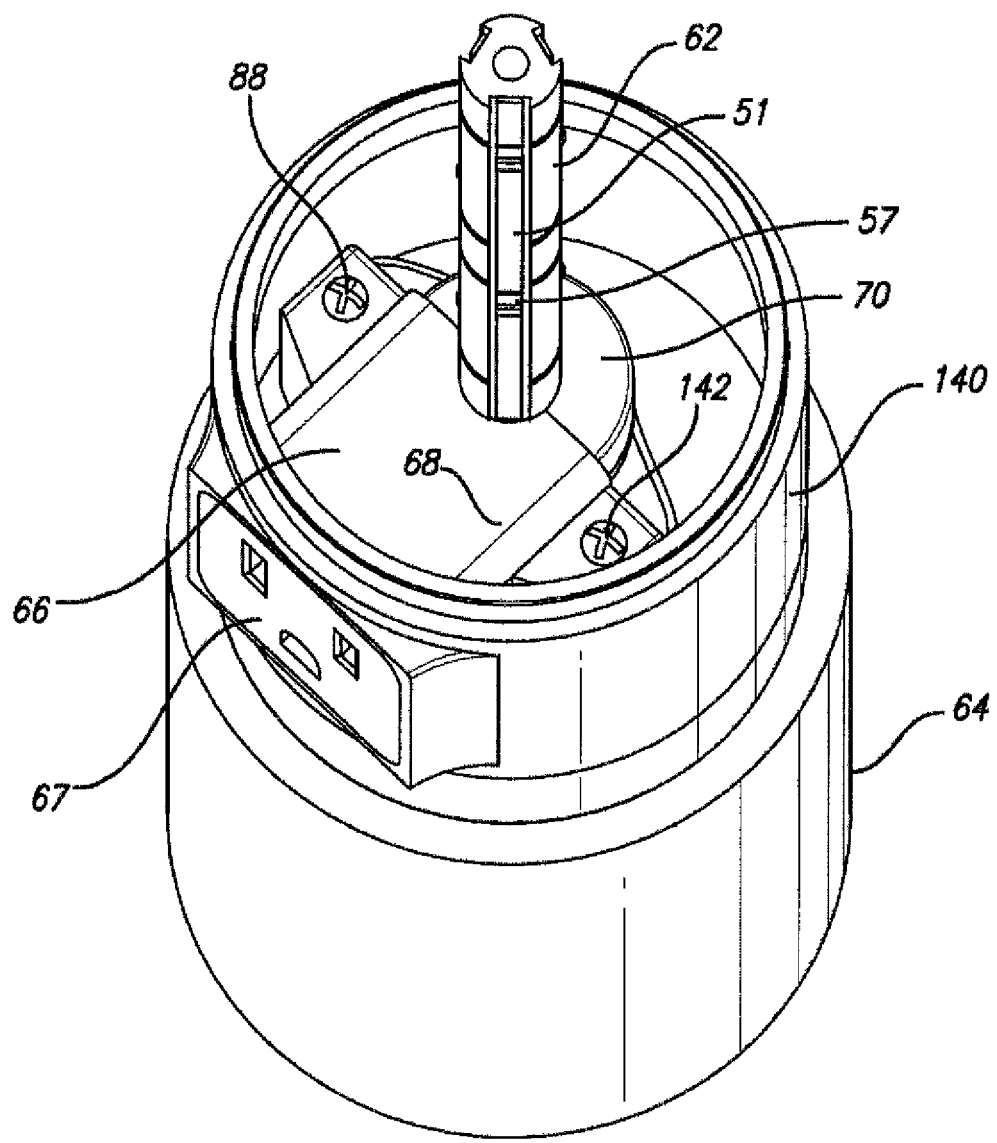
FIG. 11 is a perspective view of a closed clamp.

Referring to FIG. 11, the receptacle 66, with face 67, is clamped and parts 68 and 70 closed by screws 88 and 142 to complete the electrical connection from the vertical shaft 62, with copper strip 51 with fold 57, to the horizontal receptacle.

Figure 12:
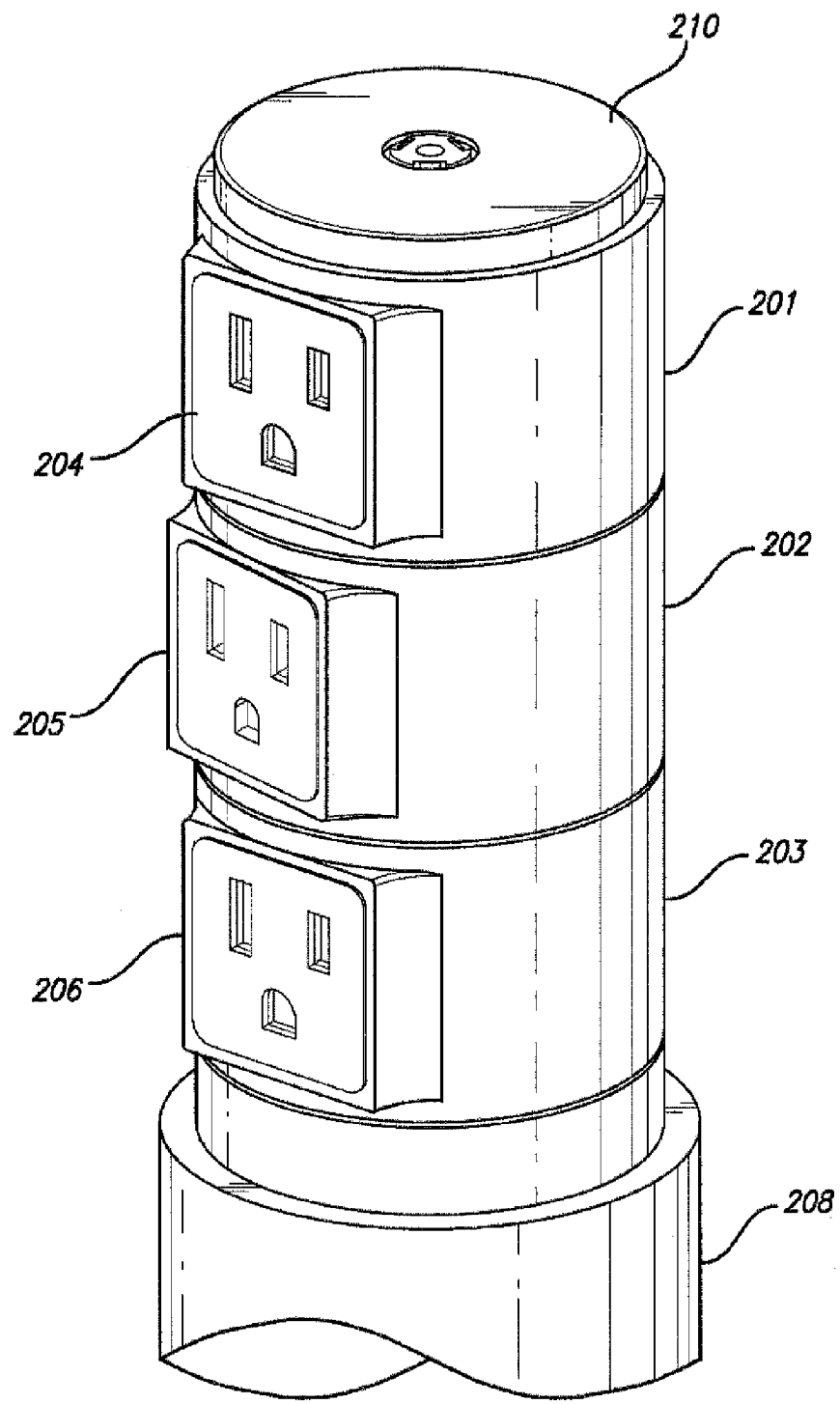
FIG. 12 is a perspective view of the assembled plug portion of the grommet; and, FIG. 13 is perspective view of the complete grommet.

Referring to FIG. 12, There is shown a completed rotating grommet in which each of the rings 201, 202 and 203 with receptacles 204, 205 and 206, will each rotate a full 360°, and anywhere in between, so that a person using the grommet who is sitting facing the back side of the receptacles could simply rotate one ring so that the receptacle faced them and they can easily plug their device into that grommet receptacle. The grommet fits into a base 208 and the grommet has an optional cap 210.

Figure 13:
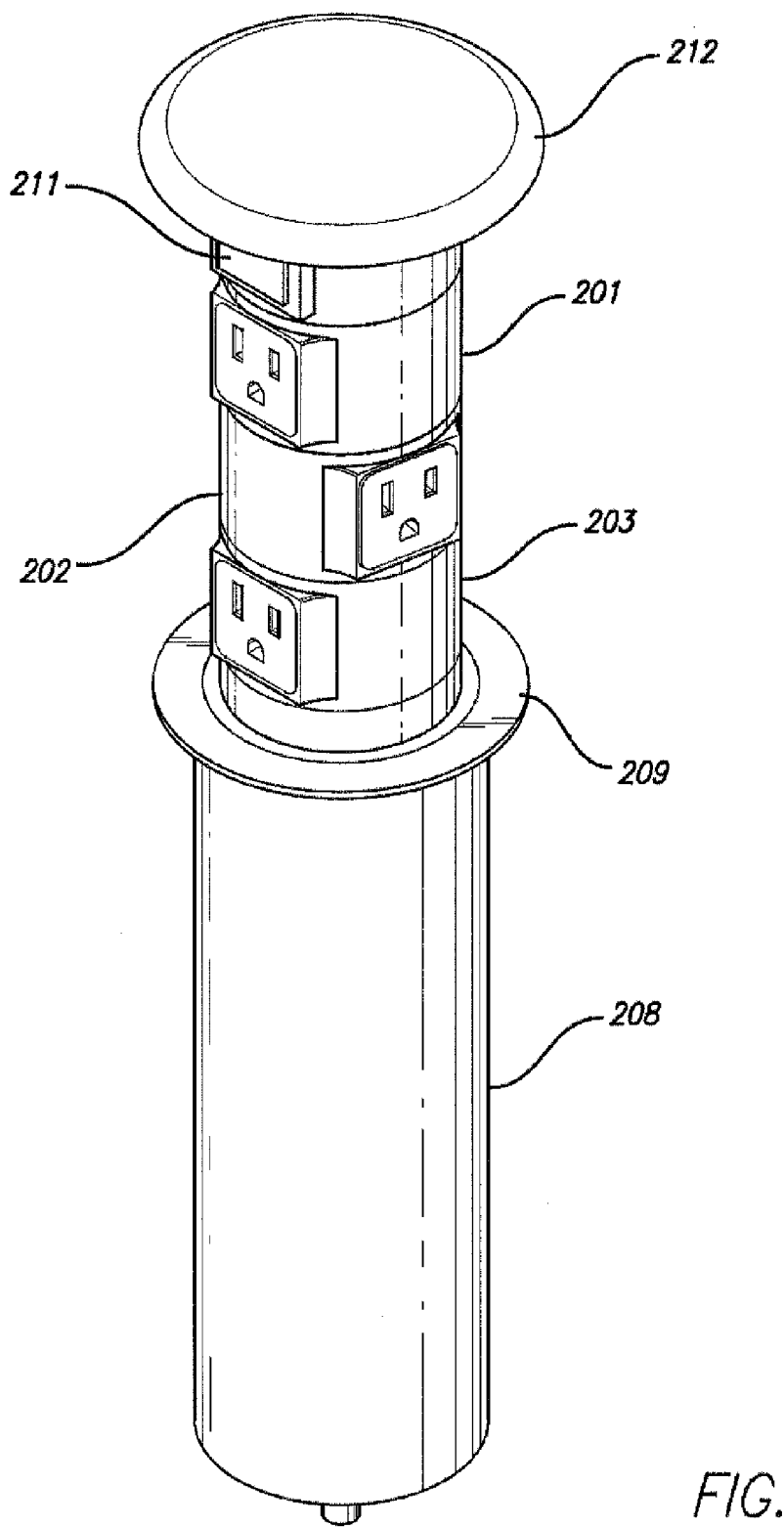

Referring to FIG. 13, shows the same grommet of FIG. 12 but with a longer view of the base 208, and showing rim 209 which stops the grommet from falling through the hole in the desk surface. There is also a top cap 212 and an optional light 211, such as an LED light for kitchen applications, using a power switch and a rubber seal for liquid if needed.

Optionally, existing power receptacles may be used with the vertical shaft and clamp. The grommet can be mounted in three different ways. One is mounted to a surface and it pops up through the grommet hole. This can be done by pressing the top down and the unit raises up an inch or so. Then you lift the unit up and it locks in place or the unit can be spring loaded to raise up. Another option is that the unit is mounted in a fixed, upright position. Yet another option could be mounted under a desk or wall mounted that could consist of up to six outlets.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A rotating power grommet mounted in an aperture in a work surface comprising;
    a base which fits into the aperture;
    means to prevent the grommet from falling through the aperture;
    three vertical copper strips, each connected to a wire which passes through a base to connect to a power source;
    the copper strips mounted in a vertical shaft which connects to the base;
    one or more electrical receptacles having arms which rotate horizontally and close to form a central bore;
    the arms having inner surfaces which are molded with copper strips;
    the central bore clamping to the vertical shaft to transfer power from the vertical shaft to the horizontal copper strips;
    the central bore allowing each electrical receptacle to rotate 360° around the vertical shaft.

2. The rotating power grommet of claim 1 in which each electrical receptacle is placed into a circular housing.

3. The rotating power grommet of claim 1 in which each copper strip has a plurality of small folds that extend outward to make contact with the horizontal copper strips.

4. The rotating power grommet of claim 1 in which each receptacle has plug pins, each of which have a copper strap fixed around the vertical shaft to transfer the vertical power to horizontal power.

5. The rotating power grommet of claim 1 in which the arms of the receptacle swing into an opening and are closed with a connector.

6. The rotating power grommet of claim 5 in which the connector is a screw.

7. The rotating power grommet of claim 1 in which the three vertical copper strips comprise a positive, negative and ground.

8. The rotating power grommet of claim 1 in which the base has a liner having a lip which is larger in diameter than the aperture to prevent the grommet from falling through the aperture.

9. The rotating power grommet of claim 1 further comprising a light located under a cap at the top of the rotating power grommet.

10. A rotating power grommet mounted in an aperture in a work surface comprising;
- a liner having a lip which is larger in diameter than the aperture in the work surface to prevent the grommet from falling through the aperture;
- three vertical copper strips, each connected to a wire which passes through a base to connect to a power source;
- the copper strips mounted in a vertical shaft which connects to the base;
- one or more electrical receptacles having two arms which rotate horizontally and close to form a central bore;
- the arms having inner surfaces which are molded with copper strips;
- the central bore clamping to the vertical shaft to transfer power from the vertical shaft to the horizontal copper strips;
- the central bore allowing each electrical receptacle to rotate 360° around the vertical shaft.

11. The rotating power grommet of claim 10 in which the three vertical copper strips comprise a positive, negative and ground.

12. The rotating power grommet of claim 10 in which each copper strip has a plurality of small folds that extend outward to make contact with the horizontal copper strips.

13. The rotating power grommet of claim 10 in which each electrical receptacle is placed into a circular housing.

14. The rotating power grommet of claim 10 in which the arms of the receptacle are closed with a connector.

15. The rotating power grommet of claim 14 in which the connector is a screw.

16. The rotating power grommet of claim 10 further comprising a light located under a cap at the top of the rotating power grommet.

\* \* \* \* \*